(12) United States Patent
Weinstock

(10) Patent No.: US 10,539,807 B1
(45) Date of Patent: Jan. 21, 2020

(54) AMBIENT-LIGHT-VISIBLE, FLOATING HOLOGRAM DISPLAY

(71) Applicant: SoliDDD Corp., Brooklyn, NY (US)

(72) Inventor: Neal Weinstock, Brooklyn, NY (US)

(73) Assignee: SOLIDDD CORP., Brooklyn, NY (US)

( * ) Notice: Subject to any disclaimer, the term of this patent is extended or adjusted under 35 U.S.C. 154(b) by 0 days.

(21) Appl. No.: 15/784,618

(22) Filed: Oct. 16, 2017

(51) Int. Cl.
| | |
|---|---|
| *G02B 27/22* | (2018.01) |
| *G02F 1/1335* | (2006.01) |
| *G09F 13/04* | (2006.01) |
| *G09F 13/18* | (2006.01) |
| *G09F 19/12* | (2006.01) |

(52) U.S. Cl.
CPC ... *G02B 27/2214* (2013.01); *G02F 1/133514* (2013.01); *G09F 13/04* (2013.01); *G09F 13/18* (2013.01); *G09F 19/12* (2013.01); *G09F 2013/189* (2013.01)

(58) Field of Classification Search
CPC ......... G02F 1/133514; G02F 1/133526; G09F 13/04; G09F 13/18; G09F 2013/189; G09F 13/12; G09F 19/12; G02B 27/2214
See application file for complete search history.

(56) References Cited

U.S. PATENT DOCUMENTS

| | | | | |
|---|---|---|---|---|
| 2013/0099179 | A1* | 4/2013 | Vanheusden | H01B 1/22 |
| | | | | 252/514 |
| 2014/0268876 | A1* | 9/2014 | Lee | G09F 13/18 |
| | | | | 362/612 |
| 2016/0333526 | A1* | 11/2016 | MacPherson | D21H 21/48 |
| 2018/0029402 | A1* | 2/2018 | Dhome | B42D 25/36 |

* cited by examiner

*Primary Examiner* — Nathanael R Briggs
(74) *Attorney, Agent, or Firm* — Ference & Associates LLC

(57) ABSTRACT

An apparatus, including: a lens layer comprising a plurality of lenticular lenses, wherein the plurality of lenticular lenses comprise a predetermined focal length, an image layer comprising printed media; wherein the image layer is disposed behind the lens layer; and a pane layer comprising at least one illumination source; wherein the at least one illumination source illuminates the lens layer, image layer, and pane layer, generating a visualization of a three-dimensional image of the printed media. Other embodiments are claimed and described herein.

17 Claims, 5 Drawing Sheets

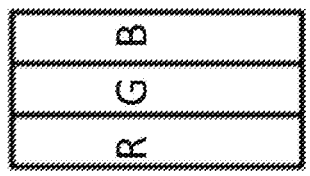
FIG. 5A  Normal RGB color filter pattern
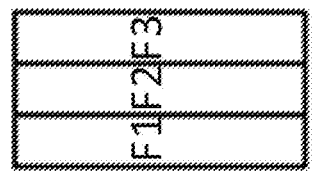
FIG. 5B  Fluorescent color filter pattern

AMBIENT-LIGHT-VISIBLE, FLOATING HOLOGRAM DISPLAY

FIELD OF THE INVENTION

The present invention relates generally to advertising signs and entertainment, and, more particularly, to hologram-like, three-dimensional images.

BACKGROUND OF THE INVENTION

Marketing and entertainment involves the use of words, slogans, trademarks, and pictures to entice or entertain a consumer. Large scale marketing, for example, using billboards, signs, advertisements, and the like, allows an advertiser to reach a large audience. Many of these signs may be located in a store near the advertised product. For example, grocery stores often advertise a product in an aisle or near the front of the store using a sign or display.

Billboards, signs, and advertisements have been used in some form for hundreds of years. One method of producing a billboard, sign, and/or advertisement is to simply print or paint a sign. For example, these advertisements may take the form of a store display, a banner, painted wall, a person holding a sign, or a window display. The advertisements may be found stores, at sporting events, at concerts, gathering places, or at any other location frequented by potential viewers. However, these signs have remained largely unchanged over the years. Most are painted or printed upon a surface. The traditional sign printed on a surface and placed in a high traffic area for consumers remains the most common example.

With the rise of internet advertising, marketing teams struggle to attain a fresh look to sign advertising mediums. Recent developments have seen new ways to achieve a marketing audience. For example, signs with more color, better resolution, or with sound grab the attention of a consumer. However, even with modest advances in sign design, most signs remain unchanged.

What is needed is a way for an apparatus to achieve a more genuine looking hologram-like display product that is viewable in normal lighting conditions for advertising, entertainment, or the like.

SUMMARY OF THE INVENTION

In accordance with the present invention, a method and apparatus uses a plurality of lenticular lenses placed in front of a display media layer, also referred to herein as an image layer in the static image embodiment. For ease of readability, the overall apparatus will be referred to herein as a hologram. The apparatus replaces the typical advertising media or entertainment media for a consumer. The hologram enables advertisers or entertainers to create a more life-like hologram compared to previous methods.

The apparatus may be created from a plurality of transparent or substantially transparent layers. One layer may include the display media layer, which may include a liquid crystal cell for video images, or an image layer, which may include a printed image. A lens layer may be placed in front of the display media layer. When viewed in conjunction with the image layer, the lens layer creates a visualization of a three-dimensional image. In other words, when viewing the lens layer and image layer in conjunction, the image appears to be a three-dimensional image. The image is printed using inks which fluoresce or otherwise radiate equal or greater light than ambient light conditions when illuminated using an illumination source. Thus, upon illumination of the apparatus a floating hologram effect may be achieved. Illumination may be achieved using different light source types.

The present apparatus offers advantages to the use of holograms used in advertising and entertainment today. Additionally, the apparatus overcomes many deficiencies of current methodologies.

In summary, one aspect provides an apparatus, comprising: a lens layer comprising a plurality of lenticular lenses, wherein the plurality of lenticular lenses comprise a predetermined focal length; an image layer comprising printed media, wherein the image layer is disposed behind the lens layer; and a pane layer comprising at least one illumination source; wherein the at least one illumination source illuminates the lens layer, image layer, and pane layer, generating a visualization of a three-dimensional image of the printed media.

Another aspect provides a method for generating a visualized three-dimensional image, comprising: obtaining a lens layer comprising a plurality of lenticular lenses, wherein the plurality of lenticular lenses comprise a predetermined focal length; disposing an image layer comprising printed media behind the lens layer; and disposing a pane layer, comprising at least one illumination source, at a location selected from the group consisting of: between the lens layer and the image layer and behind the image layer; and generating a visualization of a three-dimensional image of the printed media by illuminating, using the at least one illumination source, the lens layer, image layer, and pane layer.

A further aspect provides an apparatus, comprising: a lens layer comprising a plurality of lenticular lenses, wherein the plurality of lenticular lenses comprise a predetermined focal length; a display layer comprising a transparent liquid crystal cell, wherein the display layer is disposed behind the lens layer; and a pane layer disposed behind the display layer and comprising at least one illumination source; wherein the at least one illumination source illuminates the lens layer, image layer, and pane layer generating a visualization of a three-dimensional image of the printed media.

A BRIEF DESCRIPTION OF THE DRAWINGS

FIG. 5A illustrates an example of a normal color filter pattern.

FIG. 5B illustrates an example of a fluorescent color filter pattern.

DETAILED DESCRIPTION OF THE INVENTION

Figure 1:
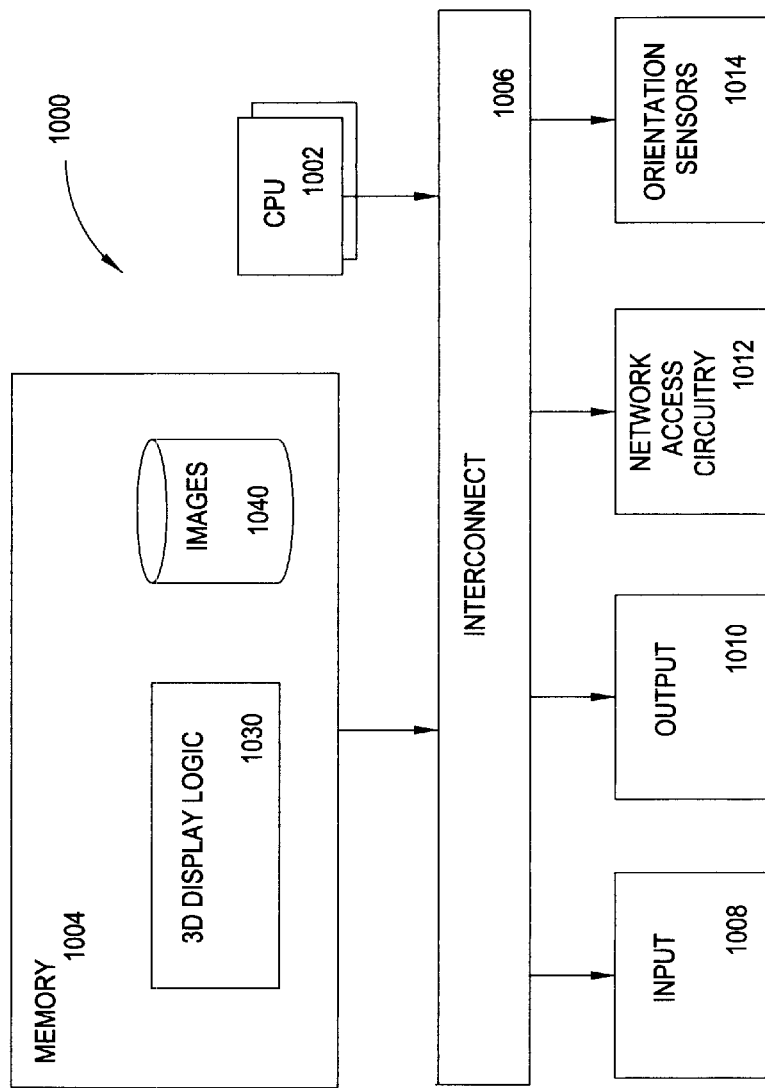
FIG. 1 is a block diagram showing an example apparatus device.

In accordance with the present invention, an embodiment provides a method and apparatus for creating a hologram image apparatus visible to a viewer. The apparatus may be placed upon a variety of surfaces, for example, a stationary surface (e.g., a wall, a building, a surface upon a pole, a store display, or entertainment venue, etc.), but may be placed some distance from any surface. The apparatus may be used in any location that a hologram image is desired, for example, a retail store aisle or storefront, a musical stage, a theater, or the like. The combination of the layers within the apparatus allows for visualization of a three-dimensional image. Additionally, the apparatus may include an illumination source which, in conjunction with special inks, creates a fluorescing image, thereby creating a floating hologram effect.

Prior methods to achieve a floating hologram image present many disadvantages. For example, one method of producing a hologram involves projecting a two-dimensional (2D) image upon a cloud to try and achieve a three-dimensional (3D) image. The cloud may be water or smoke generated artificially for the hologram effect. These cloud techniques present technical challenges as well as being messy. Additionally, the cloud method does not present an accurate three-dimensional image. For example, if a 2D image is projected upon a cloud, there is no guarantee that the cloud of water or smoke is uniform in density across its cross-section. Therefore, a portion of the image that should be in the forefront may be further back, or vice versa. These older techniques provide a hologram view that is distorted, messy, requires constant maintenance, and does not provide a uniform display.

Accordingly, a method and apparatus for creating a floating hologram is disclosed. The hologram creates a realistic effect. An embodiment uses an image or display layer behind a layer of a plurality of lenticular lenses. The media layer may be a printed layer, for example, in a static image embodiment, or may be a liquid crystal cell with a color filter, for example, in a video embodiment. The media layer may have fluorescing inks that can be illuminated using ultraviolet light to create a hologram image to a user.

The apparatus comprises a plurality of layers. In an embodiment, the apparatus may include an image or display layer, a lens layer, and a pane layer. In a static image embodiment, the image layer comprises a printed media layer. The image layer may simply be a film that is layered on another layer or may include a piece of plastic or other transparent or substantially transparent material. In either case the image may be printed as a series of interleaved images as used in typical three-dimensional image printing techniques.

The lens layer may include a plurality of lenticular lenses and may additionally include a spacer layer for creating the proper focal length. The plurality of lenticular lenses enable a viewer to focus on pixels from the image layer, located behind the lens layer in relation to the viewer's eye, to visualize a three-dimensional image. The lenses may be of a glass or plastic material and may be designed to be viewed from a particular distance to create a three-dimensional effect. The lenses may be designed to have high refractive indexes. However, as should be understood by one skilled in the art, materials with high refractive indices are merely examples and are not meant to be limiting as other materials or combination of materials to achieve a high refractive index are possible and contemplated.

In an embodiment, a transparent pane, at least a few millimeters in thickness or of sufficient thickness to stand on edge with little or no structural support may be edge lit with ultraviolet light. In one embodiment, the pane layer may act as a spacer layer which provides a proper focal length between the media and the plurality of lenticular lenses to create the desired three-dimensional effect. Alternatively, the apparatus may include a separate spacer layer. The pane layer may be of a glass, plastic, or other transparent or substantially transparent material. In an embodiment, holes may be bored into the plastic to carry light evenly throughout the pane, for example, perpendicularly to the face of the pane or parallel to the face of the pane. Additionally or alternatively, an embodiment may use a light-distributing optical film laminated or attached to one side to distribute light across the pane. In one embodiment, the pane layer may be disposed between the image layer and the lens layer. Alternatively, the pane layer may be disposed behind the image layer in relation to a viewer.

In an embodiment, the media layer may be printed with ultraviolet inks that fluoresce when illuminated using ultraviolet light. In other words, when the apparatus is not illuminated, the apparatus appears to be a mostly transparent image. When the apparatus is illuminated, for example, using the ultraviolet light source, the ultraviolet ink fluoresces and creates visualization that appears to be a hologram to a viewer. Different inks with different emitting wavelengths of light may be used to achieve a color hologram.

Referring to FIG. 1, a device 1000, for example, a device used as the viewing apparatus, is described. The device 1000 includes one or more microprocessors 1002 (collectively referred to as CPU 1002) that retrieve data and/or instructions from memory 1004 and execute retrieved instructions in a conventional manner. Memory 1004 can include any tangible computer readable media, e.g., persistent memory such as magnetic and/or optical disks, ROM, and PROM and volatile memory such as RAM.

CPU 1002 and memory 1004 are connected to one another through a conventional interconnect 1006, which is a bus in this illustrative embodiment and which connects CPU 1002 and memory 1004 to one or more input devices 1008 and/or output devices 1010, network access circuitry 1012, and orientation sensors 1014. Input devices 1008 can include, for example, a thumbdial, a knob, a keyboard, a keypad, a touch-sensitive screen, a mouse, and a microphone. Output devices 1010 can include a display—such as a liquid crystal display (LCD)—and one or more loudspeakers. Network access circuitry 1012 sends and receives data through computer networks. Orientation sensors 1014 measure orientation of the device 1000 in three dimensions and report measured orientation through interconnect 1006 to CPU 1002. These orientation sensors may include, for example, an accelerometer, gyroscope, and the like, and may be used in identifying the position of the user.

Information handling device circuitry, as for example outlined in FIG. 1, may be used in devices such as virtual reality headsets, augmented reality headsets, tablets, smart phones, personal computer devices generally, and/or electronic devices which may be used in or as near-eye displays screens for a user. The circuitry may also be used in devices for creating or viewing hologram images.

Figure 2:
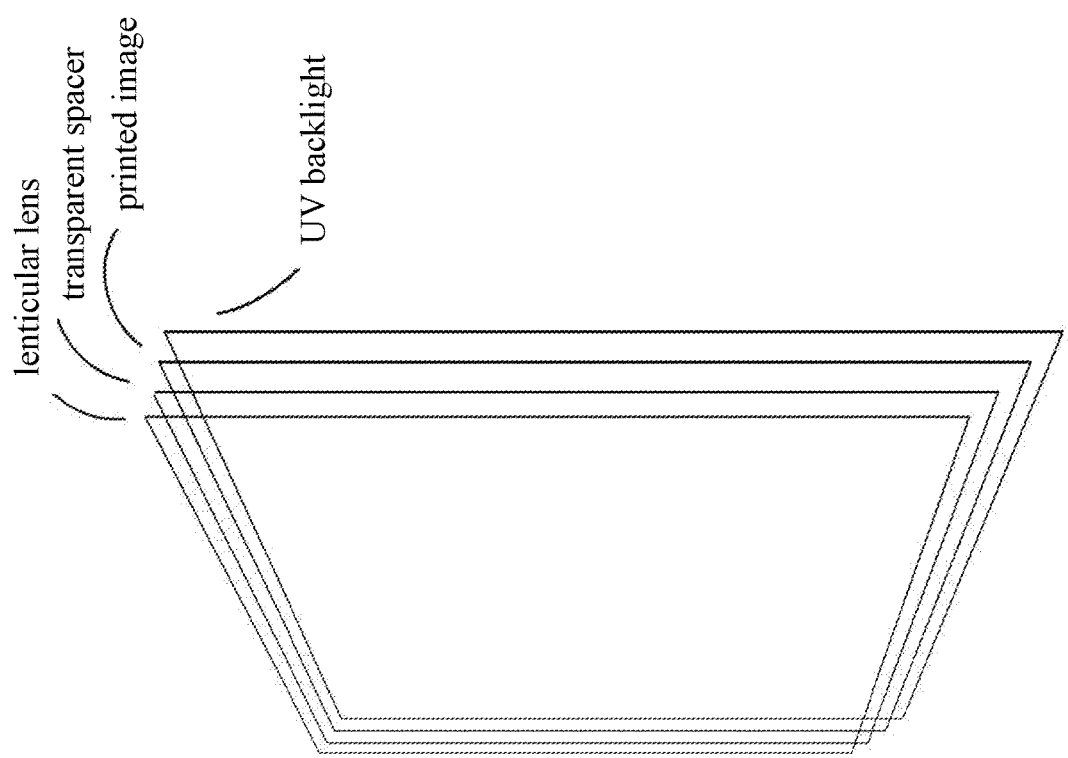
FIG. 2 illustrates example layers of an apparatus.

Referring to FIG. 2, the layers of an embodiment of a hologram apparatus are shown. In an embodiment a lens layer comprising a plurality of lenticular lenses may be placed in front of a media layer with respect to a viewer. The lenticular lenses may be designed with a predetermined focal length. This focal length may be chosen to generate a three-dimensional image at a particular viewing distance or range. Alternatively, the lens layer may include a microlens array. The lenticular lenses and/or microlens array are used to visualize the three-dimensional image. When the image is viewed through the lenticular lenses and/or microlens array, the image appears as a three-dimensional image.

In an embodiment, the layer of a plurality of lenticular lenses may be disposed in front of the media layer with respect to a view. The layer of lenticular lenses may focus pixel from the media layer to a viewer eyes to create an interlaced image, and the desired three dimensional effects and hologram. Proper selection of a lenticular lens for an embodiment may be found in U.S. patent application Ser. No. 13/360,655 and U.S. patent application Ser. No. 15/594,029 which are incorporated by reference herein.

In an embodiment, a layer comprising a pane may be placed between the layer of plurality of lenticular lenses and the layer of media. The pane layer may serve the purpose of providing a proper focal distance between the media and the lenticular lenses. In other words, the pane provides a proper focal distance between a pixel on the media and a lenticular lens. The spacer layer may also be a part of the lens layer. For example, rather than the pane layer providing a spacer layer, the lenticular lenses may be attached to a piece of transparent or substantially transparent layer that can act as the spacer layer. This spacer layer may be used to achieve the desired focal length.

As an additional alternative, the spacer layer may include a transparent or substantially transparent layer that is separate from both the lens layer and the pane layer. In one embodiment, the pane layer may be moved from between the lens and the image layer may instead be located behind the image layer. In this embodiment the layers may be arranged from the viewer as follows: a layer of a plurality of lenticular lenses, a layer of media, and a pane layer.

In an embodiment, the pane layer may be glass, plastic, or any material that allows light transfer though the pane. If the pane layer is used as the spacer layer, the pane layer may be any thickness to provide a proper focal length between a pixel of the image layer and a lenticular lens. For example, in an embodiment, a pane layer may be in the range of 9-10 millimeters. Additionally or alternatively, the thickness of the pane layer may be based upon structural concerns such that an apparatus stands by itself or with minimal support. For example, the pane layer may be used as the structural support for the entire apparatus and may therefore be of a thickness that allows the apparatus to remain upright. However, other thicknesses are contemplated and disclosed.

Figure 3:
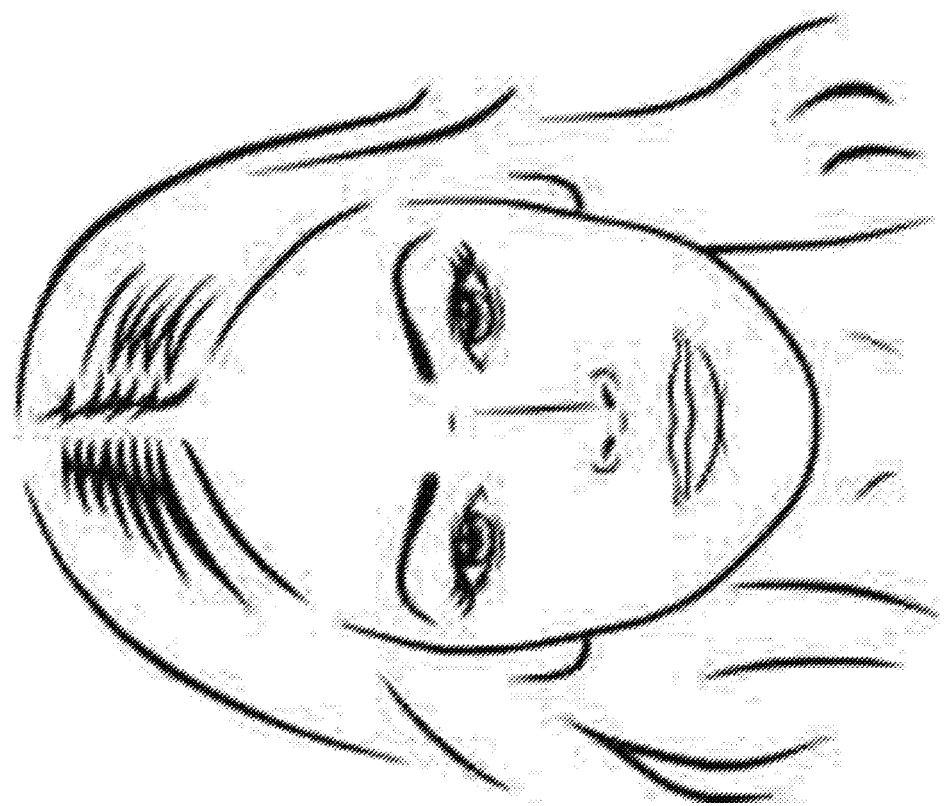
FIG. 3 illustrates an example image of a display.

The apparatus also includes an image layer, for example, referring to FIG. 3, an example embodiment of an image layer is shown. In an embodiment, the image layer may be a printed image. As discussed above, the image layer may include a printed film or may include a printed piece of plastic or other transparent or substantially transparent layer. The printed image may be printed with standard ink, ink with fluorescent properties when exposed to ultraviolet light, ink that illuminates when exposed to a different light source, or a combination thereof. For example, a model for advertising may be printed using ultraviolet ink on a media layer. Other printed material may include celebrities, spokespersons, athletes, slogans, logos, trademarks, product names, text, pictures, or any media for a viewer. Inks that work with other light spectra may be used.

In an embodiment, the pane layer of the apparatus may include an illumination source. The illumination source may be full spectrum light, ultraviolet light, or any spectra appropriate to achieve a desired effect. While wavelengths visible to humans (about 390 to about 700 nanometers) would be most common, other wavelengths are contemplated. For wavelengths outside human detection, special viewing equipment such as glasses, viewers, or the like may be used. For readability, the example of ultraviolet light and ultraviolet inks will be used. However, it should be understood that other illumination sources and/or inks may be used.

In an embodiment, ultraviolet light may be used to illuminate ultraviolet ink or other ink that will fluoresce in the presence of ultraviolet light. The ultraviolet ink may be used to print the image or a portion of the image on the media layer to achieve a desired effect. Different inks with different transmitted wavelengths may be used to provide color to the hologram image. For example, an ink that emits in the 620 to 750 nanometer wavelength range may produce red colors, and an ink that emits in the 380 to 450 nanometer wavelength range may produce violet colors. The use of different inks that emit at different wavelength allows the hologram to appear in full color. Illumination wavelengths and ink wavelengths may be selected such that a single image or multiple images may be observed either simultaneously or in series. For example, an illumination source of a first wavelength may excite ink of a first wavelength on a media layer, and a second illumination source of a second wavelength may excite ink of a second wavelength producing a plurality of holograms on a single display. In an embodiment, with fluorescent ink on a media layer and ultraviolet illumination, turning off the ultraviolet illumination may result in a transparent display.

Figure 4:
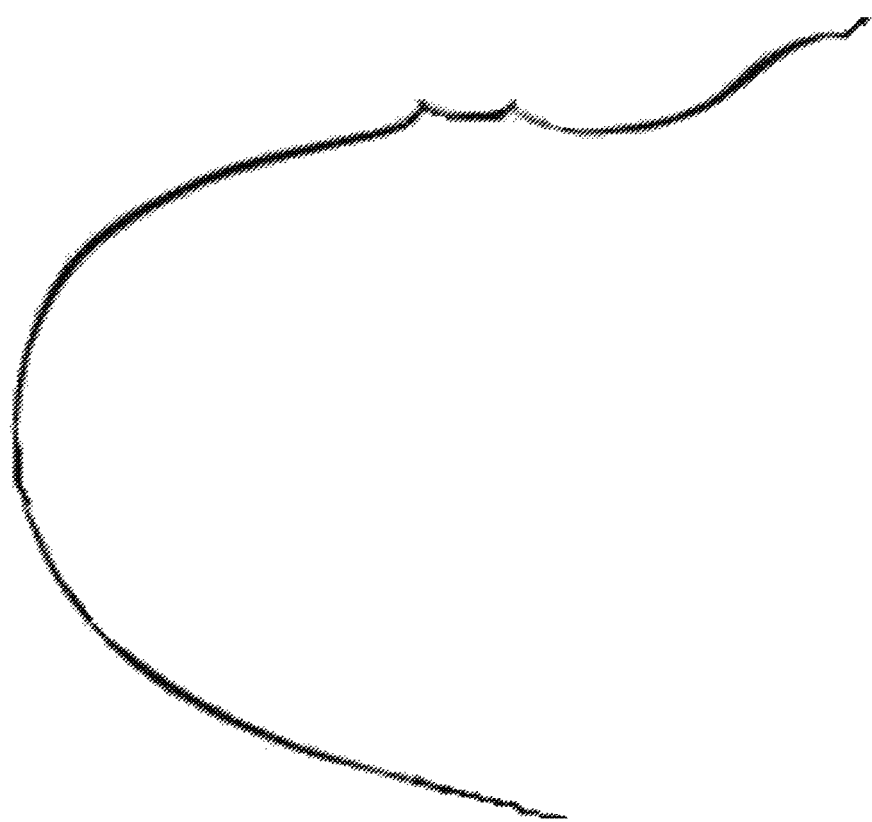
FIG. 4 illustrates an example image outline of a display.

Referring to FIG. 4, an example outline of an image is shown. This outline may illustrate a location of edge illumination for the hologram. In other words, the illustration of FIG. 4 may illustrate the position of one or more illumination sources. In an embodiment, illumination to a pane layer may be achieved by holes in the edge of the pane layer. The holes may be made by drilling, laser cutting, molding processes, or the like. In an embodiment the illumination source or plurality of illumination sources may be inserted into the hole or in close proximity to the hole. For example, the illumination sources may be positioned parallel to the face of the pane. Alternatively, the holes and illumination sources may be positioned perpendicular to the face of the pane.

In an embodiment, a light-distributing optical film may be placed adjacent to or disposed on the pane layer such that illumination around the edges is "transferred" to more central portions of the pane layer. In other words, illumination may be more evenly distributed across the pane layer and subsequently across the media layer and lenticular lens layer. Additionally or alternatively, optical channels may be manufactured into the pane layer to allow illumination to more central portions of the pane layer.

In an embodiment, illumination may be from a light source. The light source may be ultraviolet light emitting diodes (UV LEDs). A series of UV LEDs may be used to light up the edges or to light the image from the rear. The apparatus may be illuminated from one, two, three, or all four sides, in the case of a rectangular display, or from behind, or may be placed at various points around the perimeter of a display that is cut to any given shape. Different light illumination applications may be used for any shape of the hologram apparatus. The illumination along the edge may be a bar of lights, a flexible strip of lights, individually wired lights, a tube fixture, a bulb, or the like. Strips of UV LED lights may either illuminate the image or actually create the image from the rear, such as is typical with LED panels using visible light, but in this embodiment the UV light image would be seen through a fluorescent ink color filter (and possibly also through a layer which multiplies the pixel density of the display layer, changes the pixel distribution to provide an appearance of increased pixel density, or the like which may be found in U.S. patent application Ser. No. 14/247,979 which is incorporated by reference herein.) Lights emitting different wavelengths may be interspersed and used in conjunction with complementary inks such that different pixels may be illuminated by switching the light source. Alternatively, if the apparatus includes multiple light sources illuminating at different wavelengths, all light sources may be illuminated to generate a hologram having different colors.

The methods and apparatus as described herein may be used in a static image embodiment, as described above, or in a video image embodiment. In this embodiment, the apparatus includes a pane layer, as described in detail above, the display layer, as described in more detail below, and a lens layer, as described in detail above. The apparatus may also include a pixel density layer which may increase the pixel density. The pixel density layer may include a layer which multiplies the pixel density of the display layer, changes the pixel distribution to provide an appearance of increased pixel density, or the like which may be found in U.S. patent application Ser. No. 14/247,979 which is incorporated by reference herein. For example, the color filter may include a mosaic pixel pattern to increase the pixel density. The mosaic pixel pattern increases pixel density. This may increase the resolution and the life-like appearance of the hologram. In an embodiment, an ultraviolet illumination of a color filter with ultraviolet inks and a mosaic pattern, in conjunction with a transparent liquid crystal cell and a plurality of lenticular lenses, creates a hologram display.

In the video image embodiment, the image layer, as used in a static image embodiment, may be replaced by a display layer which comprises one or more liquid crystal cells. The liquid crystal cell may also include a color filter. Typical liquid crystal cells may not be transparent due to circuitry and backlighting of the component. Accordingly, in an embodiment, a transparent liquid crystal cell may be used with a color filter disposed in front of the liquid crystal cell. In an embodiment, the display of the LCD is used. However, the typical color filter, if it is printed on a separate layer of plastic or glass, is removed and replaced by a color filter printed using ultraviolet fluorescing inks. The typical (visible light) color filter may also be etched or printed on the inside of the cover glass of an LCD; in this case, such an LCD may be used with its color filter still included, but with an additional color filter using ultraviolet fluorescing inks deployed on top of that while the display would be illuminated only with ultraviolet light that lights up the ultraviolet inks and only minimally lights the visible-light inks; in this embodiment, the colors of the original color filter would add color depth to the fluorescent colors. As an example, FIG. 5A-B illustrates examples of color filter patterns are shown. FIG. 5A illustrates a typical color filter, and FIG. 5B illustrates the color filter including fluorescent inks.

A liquid crystal cell embodiment works in a similar manner to the embodiments explained above that use printed ink upon a media layer. However, the liquid crystal cell provides a medium for display of moving or dynamic images. In a liquid crystal cell embodiment, ultraviolet illumination excites ultraviolet sensitive inks of a color filter to achieve an image to the viewer. As the liquid crystal cell changes images, for example, while viewing a movie, commercial, or other dynamic image, the illumination continues to excite the ultraviolet sensitive inks of the new images to create the hologram effect for each image, thereby creating a moving hologram effect.

In another embodiment, the viewable image would be created by a matrix of UV LED strips, distributed with a wide pitch measurement between strips such that the image background is to some extent transparent. In front of the UV LED strips would be a pixel density increasing layer such that found in U.S. patent application Ser. No. 14/247,979. In front of that would be a fluorescent color filter, plus layers otherwise as described above.

The hologram may be used in many installation locations, for example, the hologram may be mounted atop a pole, on the side of a building, on a landscape, in a store, in a window, in an aisle, on a stage, or the like. The hologram may be used in any area in which the hologram effect is desired.

The hologram may be affixed to an object in many ways. For example, an adhesive layer applied to the side facing the receiving object may be used. The hologram may be in a frame that is affixed to an object. The hologram may be secured using any fastener such as nails, screws, rivets, bolts, anchors, brackets, rods, studs, wire, rope, or the like.

The hologram may be manufactured or created by obtaining a printed image or media, for example, a static image, a sign, or the like. The printed image may include more than one image, for example, the printed image may be a combination of multiple images that may each be viewed using different inks and illumination wavelengths. As an example, each portion, for example, vertical line of the image, sub-portion of the image, and the like, may correspond to a different image. Accordingly, the printed image may be created with particular viewing angles in mind, thus allowing the desired image to be viewed at the desired image. For example, different persons or products may be featured or the elements of the media layer may have apparent movement to a viewer.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. An apparatus, comprising:
   a lens layer comprising a plurality of lenticular lenses, wherein the plurality of lenticular lenses comprise a predetermined focal length;
   an image layer comprising printed media, wherein the image layer is disposed behind the lens layer, wherein the printed media is printed utilizing ultraviolet ink, the ultraviolet ink having an emitting wavelength based upon a color of the ultraviolet ink; and
   a pane layer comprising at least one illumination source;
   wherein the at least one illumination source illuminates the lens layer, image layer, and pane layer, generating a visualization of a three-dimensional image of the printed media.

2. The apparatus of claim 1, wherein the printed media is printed with at least one ultraviolet ink.

3. The apparatus of claim 1, wherein the at least one illumination object comprises an ultraviolet illumination source.

4. The apparatus of claim 1, wherein the printed media comprises a plurality of interlaced images.

5. The apparatus of claim 1, wherein the pane layer is disposed between the lens layer and the image layer.

6. The apparatus of claim 1, wherein the pane layer is disposed behind the image layer.

7. The apparatus of claim 1, wherein the at least one illumination source is disposed around an edge of the pane layer.

8. The apparatus of claim 1, wherein the at least one illumination source is disposed through channels in the pane layer.

9. The apparatus of claim 1, wherein the pane layer comprises a light-distributing optical film.

10. The apparatus of claim 1, wherein the pane layer comprises a transparent plastic sheet.

11. A method for generating a visualized three-dimensional image, comprising:
- obtaining a lens layer comprising a plurality of lenticular lenses, wherein the plurality of lenticular lenses comprise a predetermined focal length;
- disposing an image layer comprising printed media behind the lens layer; and
- disposing a pane layer, comprising at least one illumination source, at a location selected from the group consisting of: between the lens layer and the image layer and behind the image layer, wherein the printed media is printed utilizing ultraviolet ink, the ultraviolet ink having an emitting wavelength based upon a color of the ultraviolet ink; and
- generating a visualization of a three-dimensional image of the printed media by illuminating, using the at least one illumination source, the lens layer, image layer, and pane layer.

12. The method of claim 11, wherein the printed media is printed with at least one ultraviolet ink.

13. The method of claim 11, wherein the at least one illumination object comprises an ultraviolet illumination source.

14. The method of claim 11, wherein the printed media comprises a plurality of interlaced images.

15. The method of claim 11, wherein the at least one illumination source is disposed around an edge of the pane layer.

16. The method of claim 11, wherein the at least one illumination source is disposed through channels in the pane layer.

17. The method of claim 11, further comprising disposing a light-distributing optical film on the pane layer.

* * * * *